United States Patent [19]

Shrull et al.

[11] Patent Number: 4,677,922
[45] Date of Patent: Jul. 7, 1987

[54] SINGLE PASS FRACTURE PLANTING SYSTEM

[76] Inventors: Dale Shrull, Rte. 5, Box 31A; Joe W. Hendricks, Rte. 5, Box 179, both of Russellville, Ky. 42276

[21] Appl. No.: 708,212

[22] Filed: Mar. 5, 1985

[51] Int. Cl.$^4$ .............................................. A01C 5/00
[52] U.S. Cl. .................... 111/52; 172/451; 180/139
[58] Field of Search ............... 172/324, 326–328, 172/679–680, 443, 450, 448, 451, 449, 678, 439; 111/7, 52; 180/138, 139; 280/462, 463

[56] References Cited

U.S. PATENT DOCUMENTS

| | | | |
|---|---|---|---|
| 2,363,901 | 11/1944 | Silver | 172/448 X |
| 2,575,527 | 11/1951 | Oerman | 172/326 X |
| 2,610,562 | 9/1952 | Ward | 172/324 X |
| 2,655,851 | 10/1953 | Pursche | 172/324 X |
| 3,295,611 | 1/1967 | Bunting et al. | 172/449 |
| 3,314,386 | 4/1967 | Kopaska | 111/52 |
| 3,391,663 | 7/1968 | Cagle et al. | 111/52 |
| 3,608,645 | 9/1971 | Meiners | 111/7 X |
| 4,048,929 | 9/1977 | Zumbahlen | 111/6 X |
| 4,116,138 | 9/1978 | McFarland et al. | 111/7 |
| 4,191,262 | 4/1980 | Sylvester | 111/52 X |
| 4,391,334 | 7/1983 | Carrick | 172/326 |
| 4,406,329 | 9/1983 | Schlueter | 111/52 X |
| 4,409,912 | 10/1983 | Koronka et al. | 111/7 |
| 4,552,224 | 11/1985 | Luscombe | 172/324 |

FOREIGN PATENT DOCUMENTS

| | | | |
|---|---|---|---|
| 941329 | 4/1956 | Fed. Rep. of Germany | 172/326 |
| 1135231 | 8/1962 | Fed. Rep. of Germany | 172/443 |

Primary Examiner—Robert A. Hafer
Assistant Examiner—Danton DeMille
Attorney, Agent, or Firm—Thomas D. Linton

[57] ABSTRACT

A single pass fracture planting system comprised of a tractor which tows a subsoil fracture tiller and a drawn multi-function planter drawn by a unique hydraulically controlled hitch system. The tractor draws a subsoil fracture tilling system comprised of a plurality of plows which fracture the soil to a depth of approximately one and a half feet while leaving surface residue largely undisturbed. The suboil fracture blades are mounted on a platform having a storage tank for anhydrous delivered to the soil through tubes mounted on the shanks of the fracture tiller blades. A multi-function drawn planter is drawn behind the subsoil fracture tiller by a hitch system having a hydraulically controlled drawbar. The hitch system is comprised of a frame having a drawbar pivotally mounted and hydraulically damped at one end with the opposite end being free to swing from side to side in a controlled fashion. Drawbar locking hydraulic cylinders center the planter during a planting pass.

7 Claims, 12 Drawing Figures

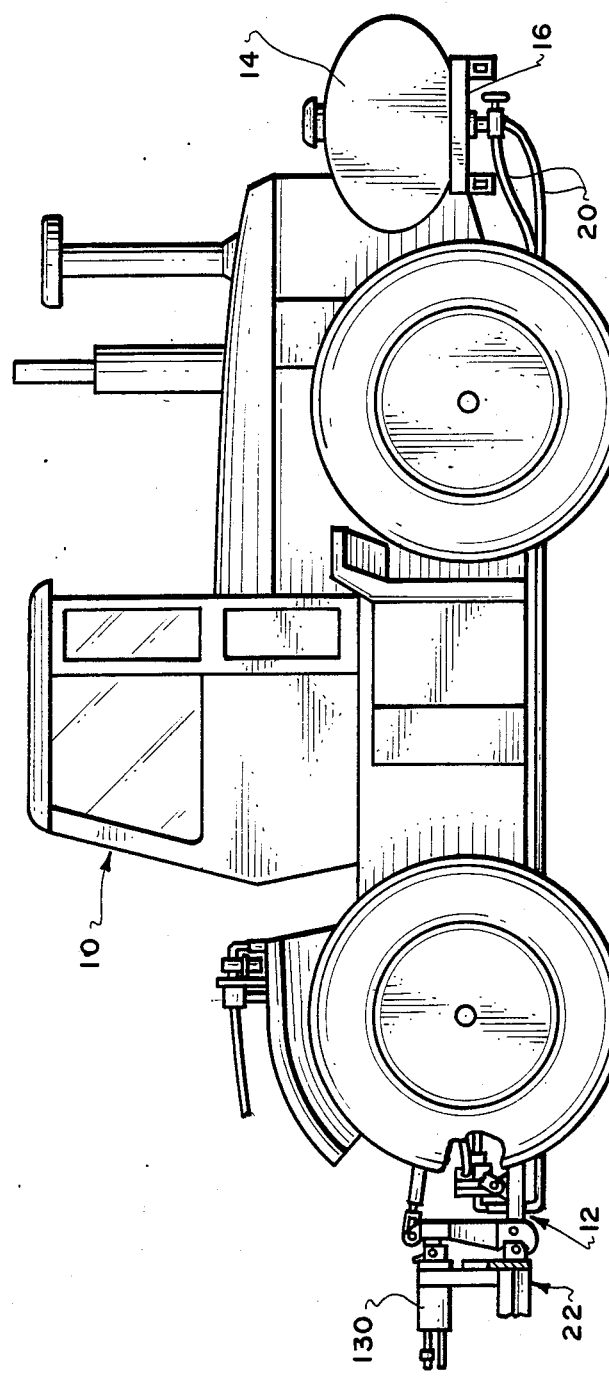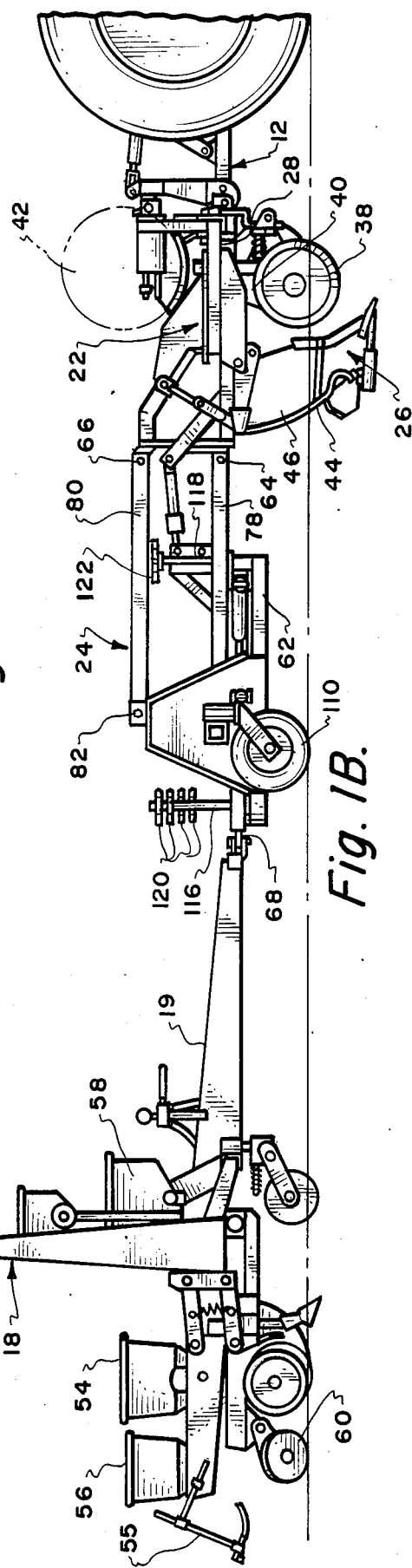
Fig. 1A.
Fig. 1B.

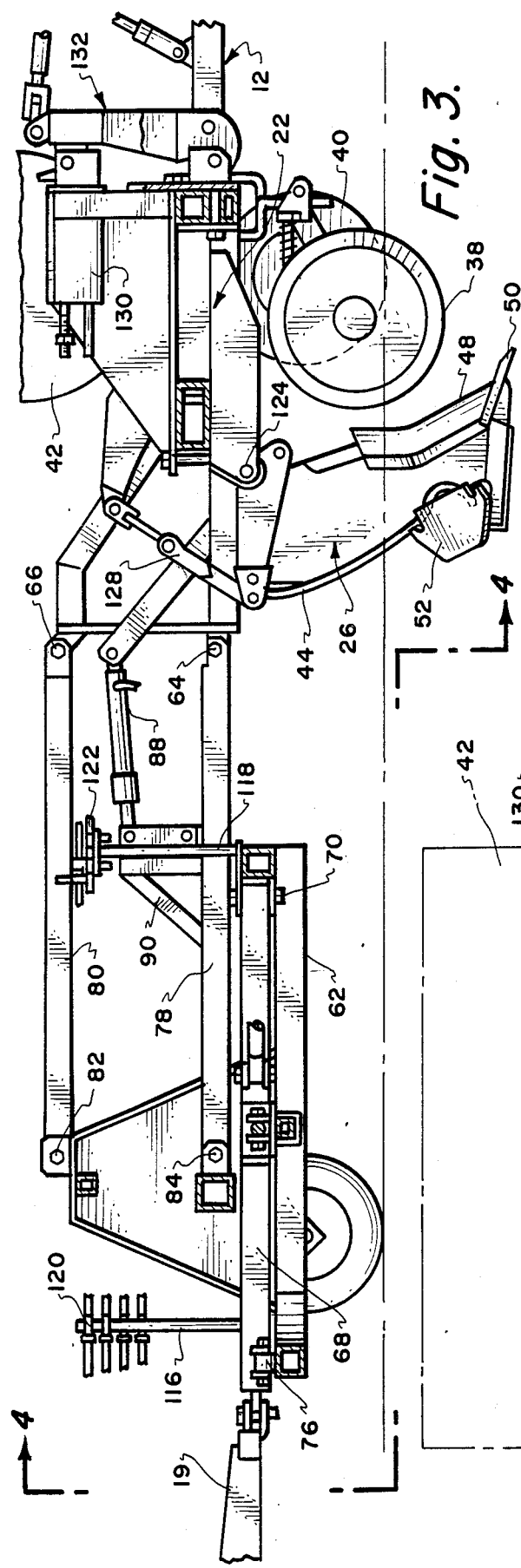
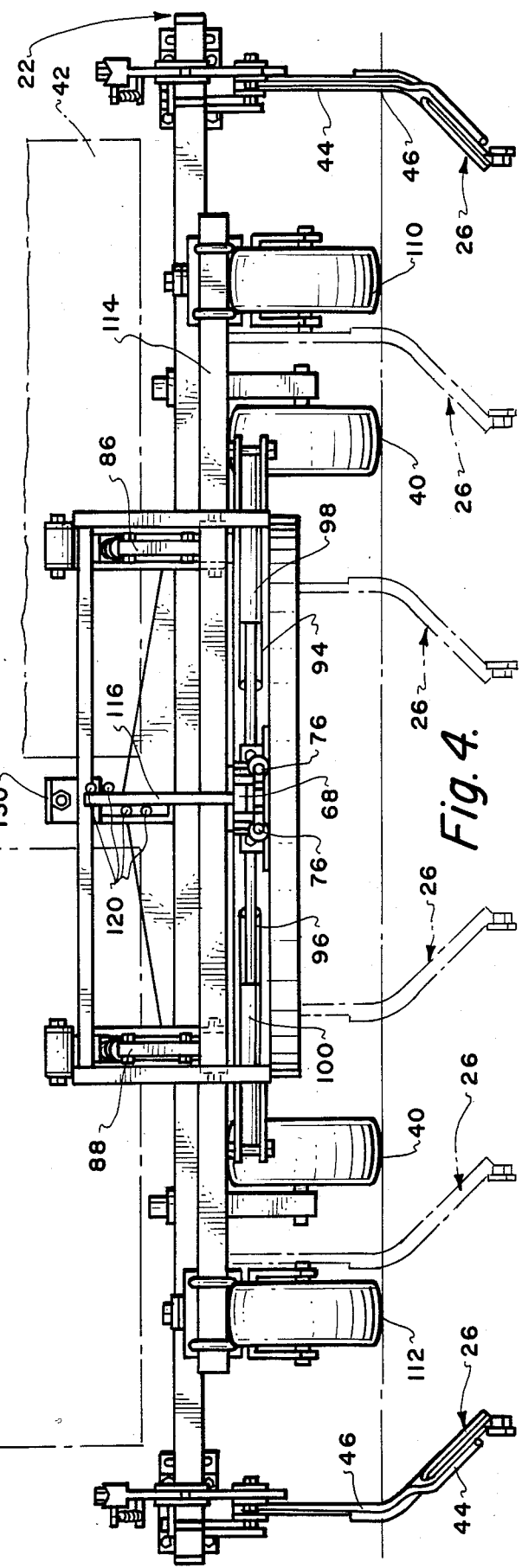

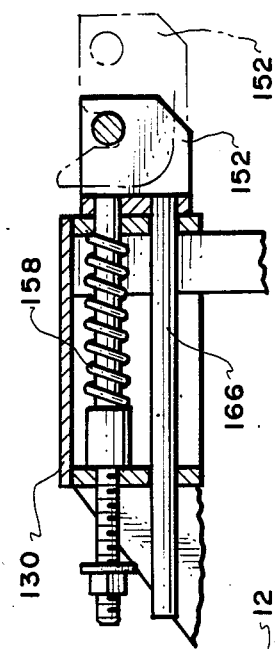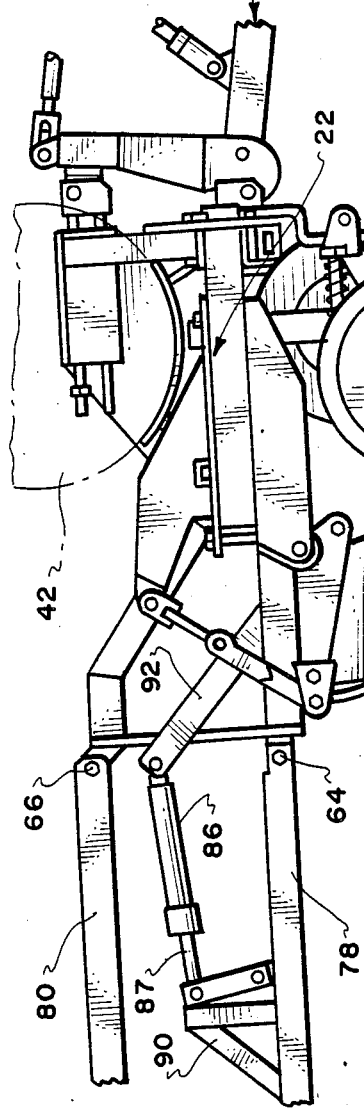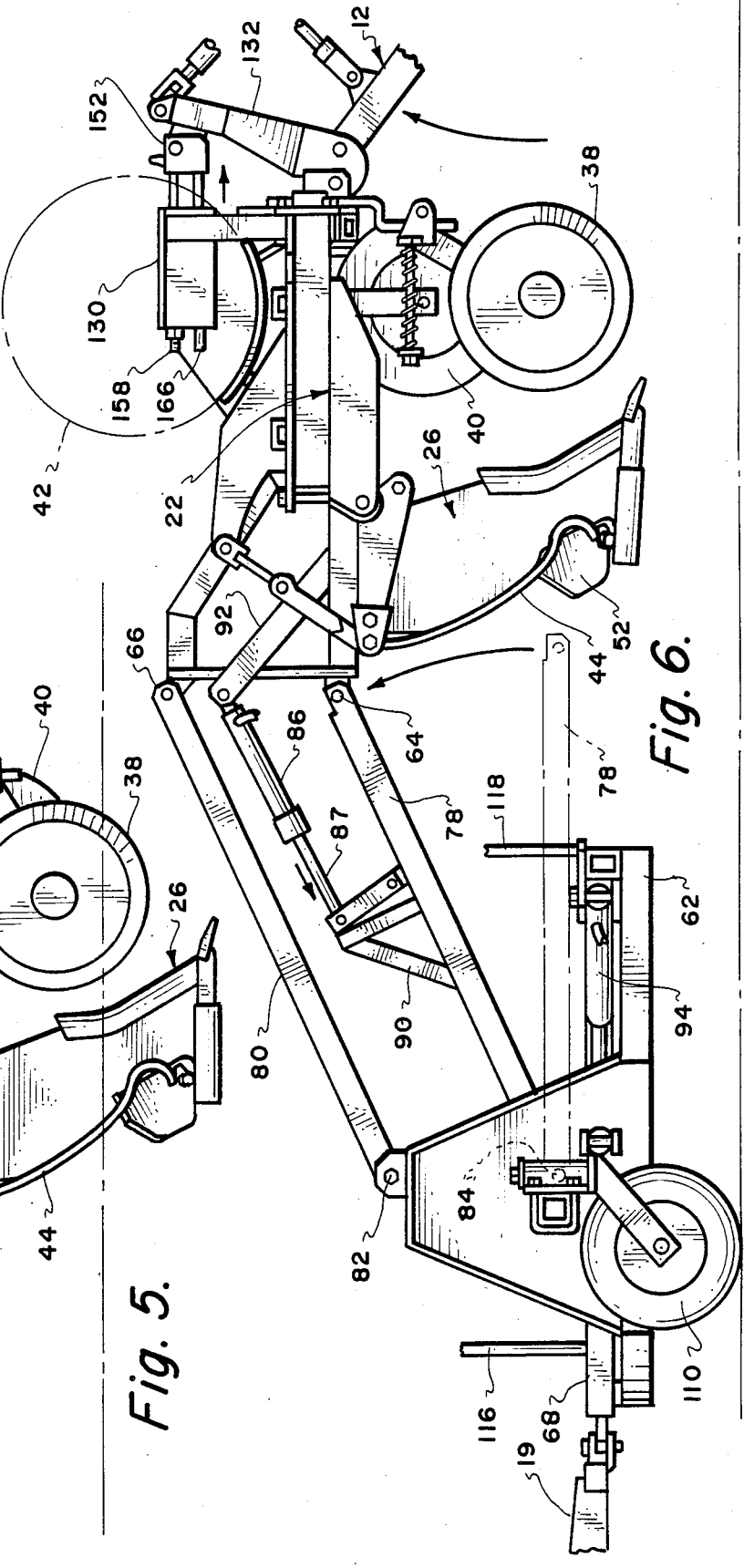

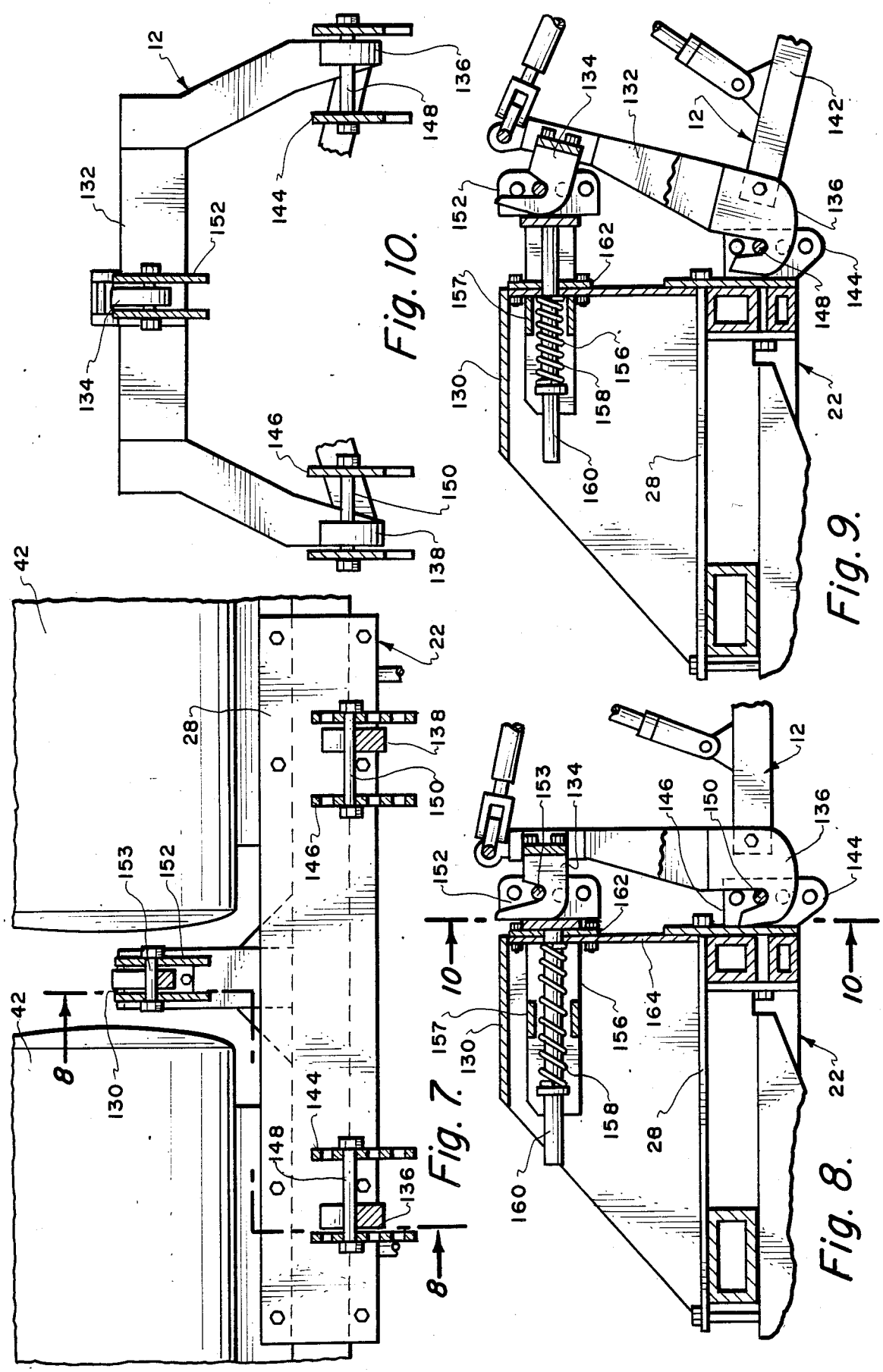

SINGLE PASS FRACTURE PLANTING SYSTEM

FIELD OF THE INVENTION

This invention relates to improved tilling and planting systems and more particularly relates to a single pass subsoil fracture tilling and drawn planting system.

BACKGROUND OF THE INVENTION

Recent developments in tilling systems include the development of a improved subsoil fracture system described in U.S. Pat. No. 4,409,912, dated Oct. 18, 1983. This system known commercially by the trademark Paraplow is comprised of a plurality of blades mounted to fractures the soil at approximately a foot and a half under ground at an angle of 45° to loosen the soil and assist water movement while leaving the surface virtually undisturbed. One of the purposes of this invention is to overcome major causes of soil compaction and hard pan pressure from heavy tractors and farm equipment. While this system is effective it does not minimize the problem as it generally takes as many as four passes for tilling and planting a field. These operations involve tilling the soil first, then making passes to apply fertilizer, herbicide, insecticide and anhydrous ammonia in addition to drawing a planter across the field to plant the seed. There are multi-function planters available such as those from John Deere, Model 7000 and such which do provide several operations in one pass. However, none of these devices permit a total one pass planting system. It would be advantageous in reducing the cost of fuel, equipment operating hours, labor hours as well as reducing compaction from heavy tractor equipment if a single pass could accomplish the tilling and planting.

It is therefore, one object of the present invention to provide a single pass fracture tilling and planting system.

Yet another object of the present invention is to provide a single pass planting system having a unique hydraulically controlled hitch.

Still another object of the present invention is to provide a single pass planting system having a unique hitch to assure proper row tracking even while planting on contours.

Yet another object of the present invention is to provide a single pass planting system having a subsoil fracture tiller.

Still another object of the present invention is to provide a single pass planting system including means for simultaneously applying anhydrous ammonia with tilling.

Yet another object of the present invention is to provide a one pass planting system having unique hitch which can draw a variety of commercially marketed planters.

Yet another object of the present invention is to provide a single pass planting system which simultaneously tills by fracturing the subsoil, applies fertilizer, herbacide, insecticide and seed in a single pass.

BRIEF DESCRIPTION OF THE INVENTION

This invention relates to tillage and planting systems and more particularly relates to a system for subsoil fracture tilling and planting on a single pass over a field.

The single pass planting system of the present invention is comprised of a two or four wheel tractor drawing a subsoil fracture tillage device and a drawn multi-function planter connected by a unique hitch. The subsoil fracture tiller utilizes a plow known as a Paraplow described and disclosed in U.S. Pat. No. 4,409,912. A plurality of plow blades are mounted on a specially constructed platform which supports an anhydrous ammonia storage tank and includes adjustable depth gage wheels and adjustable coulters. The anhydrous ammonia storage tank delivers anhydrous ammonia to the soil through a tube fitted to the rear edge of the plow shank. The plow shanks fracture the subsoil to a depth of 16 to 20 inches while leaving the surface residue largely undisturbed. A coulter cutting disc adjustably mounted on the platform is used to cut a slit in the surface to allow clogged-free penetration and travel of the plow blade or shank. The adjustable wheels regulate the depth at which the fracturing plow blades penetrate the soil surface. The blades, depth gage adjustable wheels and coulter cutting disc perform the same or a similar function as that described in U.S. Pat. No. 4,409,912.

With the unique hitch disclosed and described herein nearly any type of commercially marketed planter which can be drawn by a tractor is suitable for use. One such planter is John Deere Model 7000 drawn planter which can have a variety of configurations The unique hitch eliminates all shock to the drawn planter during turning and also allows the planter to come back to center and be automatically locked hydraulically. The arrangement of the hitch allows a shorter turning radius of the complete unit.

The unique hitch is comprised of a frame pivoted for rotation at opposite ends when one end is lifted vertically having a drawbar pivotally mounted at the center of a forward cross beam for horizontal swinging movement. Hydraulic cylinders damp and control movement of the drawbar while rollers at the far end of the drawbar guide movement during turns. Additional hydraulic cylinders lock the drawbar in a center position to keep the planter aligned with the subsoil fracture tiller during planting and are automatically released allowing full pivotal movement of the drawbar during turns when the tiller is lifted. The hitch provides stanchions for supporting connecting hydraulic hoses through quick disconnect hydraulic couplers between the tractor and the planter. The planter system fractures the subsoil, injects anhydrous, applies fertilizer, and insecticide, sprays herbacide and plants the seed in a single operation.

BRIEF DESCRIPTION OF THE DRAWINGS

FIGS. 1a and 1b are a side elevation illustrating the construction of the single pass planting system.

FIG. 3 is an enlarged detail view of the subsoil fracture tiller and the hitch system taken along line 3—3 of FIG. 2.

FIG. 4 is a view of the hitch and subsoil fracture tilling system taken at 4—4 of FIG. 3.

FIG. 5 is a partial side elevation of the fracture tiller system and hydraulic lift system of the hitch.

FIG. 6 illustrates the operation of the lift system for lifting the subsoil fracture tillage device and the hydraulic lift system of the hitch.

FIG. 7 is a sectional view through the three point hitch system taken at 7—7 of FIG. 2.

FIG. 8 is a sectional view through the mast system taken at 8—8 of FIG. 7.

FIG. 9 is a sectional view illustrating operation of the spring loaded mast system for the three point trailer hitch of FIG. 8.

FIG. 10 is a sectional view of the three point hitch system looking toward the tractor taken at 10—10 of FIG. 8.

FIG. 11 is a partial section illustrating an alternate spring loaded top link assembly between the plow-platform and the tractor three point hitch taken along line 11—11 of FIG. 2.

DETAILED DESCRIPTION OF THE INVENTION

Figure 2:
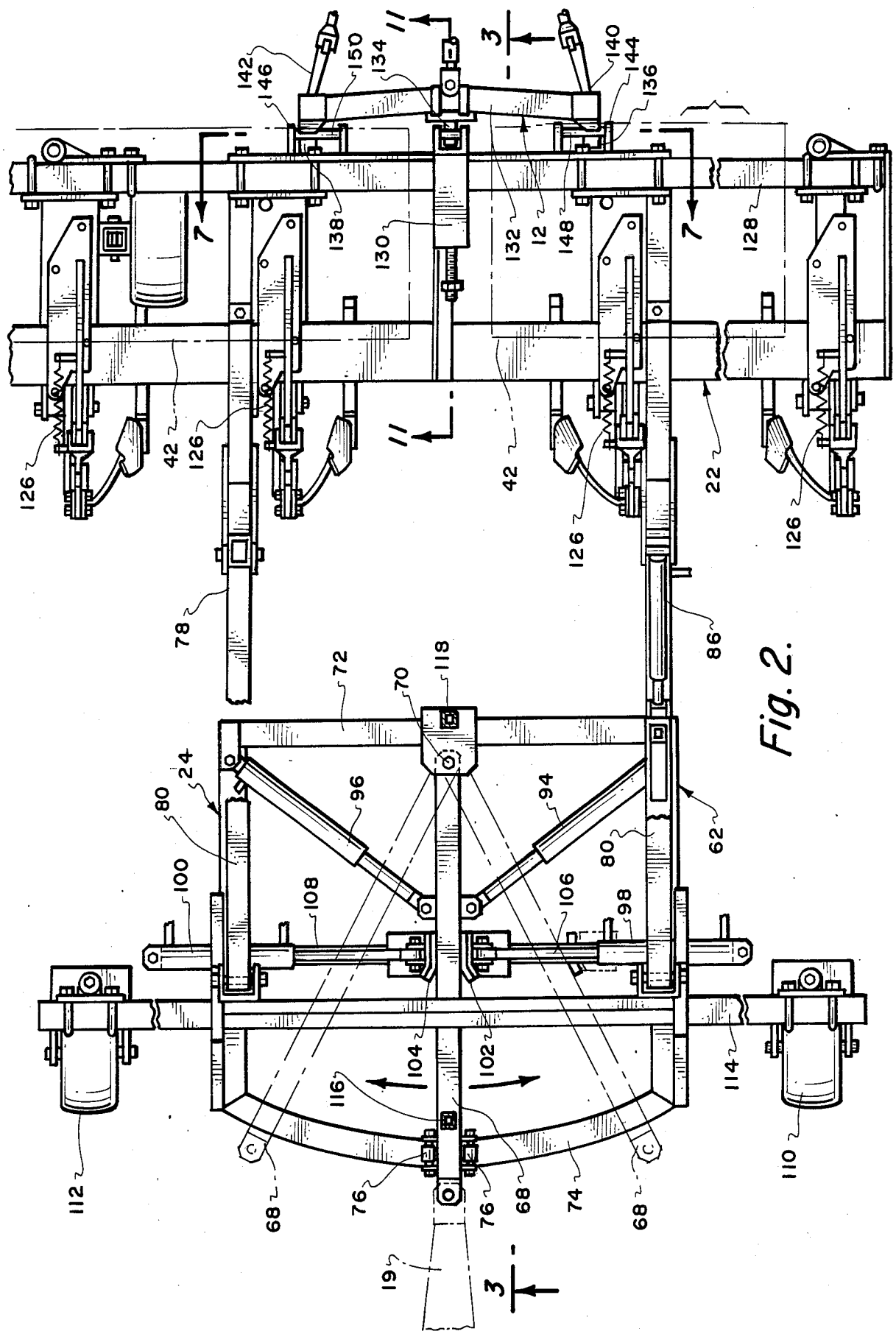
FIG. 2 is a top view illustrating the subsoil fracture tilling system and the unique hitch for drawing a planter.

The single pass subsoil fracture and planting system is shown generally in FIGS. 1a and 1b. The system can use any commercially available two or four wheel tractor 10 for drawing a tilling and planting system with a three point hitch system 12 known in the art. Chemical storage tanks 14 are mounted on forward platforms 16 on the tractor and are connected to the planter 18 by fluid lines 20. The tractor 10 draws a subsoil fracture tiller 22 and planter 18 connected by specially designed hitch system 24.

The subsoil fracture tilling system has subsoil plows 26 substantially as disclosed and described in the aforementioned U.S. patent. The subsoil plows 26 are mounted on a frame 28 which also includes coulter cutting discs 38 associated with each plow and adjustable depth gage wheels 40 (FIG. 4). Included on the frame 28 of subsoil fracture tiller is an storage tank 42 for injection anhydrous ammonia under the surface of the soil through stainless steel tubes 44 mounted on the trailing edge of the plow shank as illustrated in FIGS. 3 and 4.

Subsoil fracture tiller blades are modified versions of those shown in the aforementioned patent and can be seen more clearly in FIGS. 3 and 4. In the design as shown there are six tiller blades although optionally there may be more or less. The subsoil blades 26 have shanks angled at 45° with the shanks on opposite sides of center being angled at 45° toward each other. The tiller blades have shin plates 48 points 50 and adjustable shatter plates 52 as described in the patent. A unique feature of the invention is the addition of stainless steel tubes 44 following the contour of the trailing edge of the blade shanks 46 for injecting anhydrous ammonia from tank 42 approximately one inch above the depth of the fracture tiller blades.

Also mounted on the tiller frame 22 are vertically adjustable wheels 40 which provide adjustment of the depth of penetration of the subsoil fracture plows 26. Coulter cutting discs 38 associated with each blade or plow 26 cut a slit in the soil to assist the penetration and movement of the blades.

A unique hitch system connects a drawn planter 18 to the subsoil fracture tilling system and tractor. The drawn planter can be any of a number of commercially available drawn planters such as the John Deere Model 7000 which has seed hoppers 54, insectide hoppers 56 and fertilizer hoppers 58. Angled seed firming wheels 60 close a furrow over seed planted accurately between the fracture blade slots caused by the blade shanks.

The application of seed and chemicals by the drawn planter is controlled by the unique hitch system 24 shown in detail in FIGS. 2 through 6. The hitch system 24 is comprised of a frame 62 having a cross beam 72 and a curved beam 74 joined together to form a substantially rectangular frame. Drawbar 68 is secured to cross beam 72 at 70 to swing from side to side as indicated at the arrows. Rollers 76 mounted on the draw bar guide the bar along the surface of curved beam 74.

The hitch is attached to the fracture tiller device by beams 78 and 80 pivotally secured to the fracture tiller device at 64 and 66 and to the hitch frame at 82 and 84. Lift assist hydraulic cylinders 86 and 88 are pivotally secured to support 90 mounted on beams 78 and to support 92 mounted on the fracture tilling device. This permits these beams to pivot upward with the cylinders 86 and 88 assisting in lifting the tiller system 22 while keeping hitch frame 62 level.

The hitch system is unique in that the swinging movement of the drawbar 68 is damped by hydraulic cylinders 94 and 96 to minimize shocks to the drawn planter secured to drawbar 68. Additionally, hydraulic cylinders 98 and 100 control the position of drawbar 68 during planting or when turning. Stop plates 102 and 104 mounted on arms 106 and 108 of hydraulic cylinders 98 and 100 automatically center the drawbar when the system is being used for planting. This assures the alignment of firming wheel 60 with the planted row between the slots produced by the shanks of plows 26. The hydraulic locking cylinders 98 and 100 hold the swinging drawbar 68 in a center position when planter is lowered in field position. When the fracture tilling device 22 is raised as shown in FIG. 6, cylinders 98, 100 are retracted releasing the drawbar 68 to swing from side to side for turning in a short radius without allowing the drawn planter to hit any part of the fracture tilling device 22.

The drawbar travel control cylinders 94 and 96 can be adjusted with a flow control valve (not shown) to control the speed of travel of the swinging drawbar to minimize shock to the drawn planter unit when the tractor is turning at the end of the row.

The hitch also includes 360° swivel mounted flotation tires 110 and 112. Tires 110, 112 are mounted outboard of the frame on axle 114 to allow the hitch and drawn planter to easily turn without any binding of the tires.

The hitch also includes stanchions 116 and 118 for mounting quick disconnect couplers 120 and 122 for connecting the hydraulic lines necessary between the tractor and the drawn planter unit.

Each plow or blade 26 is mounted on frame 22 with a pivot mounting system manufactured by Howard Rotovator Company of Muscoda, Wis. comprised of a huge trip mechanism held in place by coil springs 126. This mounting system can be seen more clearly in FIGS. 2 and 6. The plow is pivotally mounted at 124 to rotate upwards when blade 46 strikes any hard object such as a rock. A tripping system is provided in the form of a spring 126 and hydraulic cylinder 128 providing the largest trip mechanism for pivoting the plow shank upward when a hard object is encountered. This prevents damage to the blade system.

The tiller or plow frame 22 is provided with a mast 130 and lifting brackets 132 and 134 as shown in FIG. 2 for connection to three point hitch system 12 supplied with tractors manufactured by John Deere. The three point hitch is comprised of a yoke 132 having center lift hook 134 and left and right outboard lift hooks 136 and 138 as can be seen more clearly in FIG. 11. The three point hitch and lifting system 12 connects to the tractor through lower lift links 140 and 142 operated by hydraulic system in the tractor (not shown).

The plow system 22 of the present invention provides a unique connecting system on frame 28 for connecting to three point hitch system 12 of the tractor as illustrated in FIGS. 8 through 11. The connecting system mounted on frame 28 permits the plow or tiller system to be maintained substantially level. This permits plow shanks 46 to ride up and out of the soil at a gradual constant angle at the end of a row being planted. The connect system is provided in the form of a mast 130 mounted on the frame 28 and right and left brackets 144 and 146 having lift pins 148 and 150. Outboard hooks 136 and 138 engage the lift pins 148 and 150. The lift position is adjustable by moving the lift pins 148 and 150 up or down in a series of vertical holes provided in the brackets 144 and 146.

Center lift bracket 152 having lift pin 153 is spring loaded to allow plow frame 22 to remain level when being lifted which permits yoke 132 to tilt as will be described in greater detail hereinafter. Center lift bracket 152 is provided with a lift pin 153 guide plates 156 spring 158 and spring guide rod 160 and is mounted the mast 130 by mounting plate 162 bolted to front plate 164.

The hitch connecting system operation is illustrated in FIG. 9. When plow frame 22 is lifted as shown in FIG. 6 spring loaded lift bracket 152 will flex or extend allowing yoke 132 to tilt keeping plow frame 28 substantially level. This allows the plows to gradually plow their way out of the ground at a substantially constant angle, easing the removal of the plow shanks at the end of a plant.

An alternate construction for center lift bracket 152 is illustrated in FIG. 11 in which like parts are given like reference numbers. The partial section view illustrates the spring loaded top link of the plow three point hitch system that hooks to the tractor three point hitch (standard on all tractors). The mast hitch bracket 152 is mounted substantially as before and loaded with spring 158. Instead of guide plates a guide rod 166 is provided otherwise the lift bracket operates in substantially the same fashion as described hereinabove. As shown in FIG. 6, lift bracket 152 extends when the frame 22 is being lifted allowing the yoke 132 to pivot keeping the frame substantially level.

It should be noted that when the three point hitch system 12 is lifting the plow frame and plows the lift assist cylinders 86 and 88 will only come into play when the weight of the plow system approaches the maximum lift capability of the three point hitch system. Thus the lift assist cylinders are connected to an auxilliary hydraulic system (not shown) already existing in the tractor which will be operated whenever the plow system approaches maximum weight. This will usually occur only when anhydrous tanks 42 are full. Thus as long as the maximum weight of the plow system does not exceed the limit of the three point hitch system the lift assist cylinders are not needed.

The operation of the system is illustrated in FIGS. 1 and 6. FIG. 6 illustrates the normal towing position when not planting. The fracture tiller system or device 22 is lifted by means of tow bar three point hitch system 12 described which lifts the plow on tiller system. Arm 87 on the lift assist cylinder 86 extends lifting the rear portion of the plow system for transport to a field or when making turns at the end of a row if the weight of the plow system is close to or exceeds the limit of the three point hitch. At this time, pivotted connecting beams 78 and 80 are tilted upwards as illustrated in FIGS. 6. The main frame 62 of the hitch remains level with drawbar 68 attached to hitch 19 of drawn planter 18. At this time drawbar travel control cylinders 94 and 96 are adjusted to control the speed of travel of the drawbar 68 to prevent shocks to the drawn planter. Additionally, hydraulically locking cylinders 98 and 100 are retracted releasing the drawbar to swing to the left or right during turns.

The fracture tilling device and planter are towed to a field to be planted and the fracture tilling plow lowered to the ground. Depth adjustment wheels 40 are then adjusted for the depth at which the plows 26 are to fracture the subsoil. When properly lowered and adjusted the hydraulic locking cylinders 98 and 100 are activated to center drawbar 68 aligning planter 18 behind hitch system 24. Planting is begun by hydraulically activating the anhydrous ammonia for delivery through tubes 44 from anhydrous ammonia storage tank 42 on the fracture tilling plow system. At the same time herbacide is released from nozzle 55, and seed, insecticide and fertilizer are released from bins 54, 56 and 58 as the planter is drawn across a field. These operations are performed in a manner known in the art by the hydraulic systems which are provided with the tractor. When the end of a row is reached hydraulic lift cylinders (not shown) to lift three point hitch 12 are activated to lift the fracture tilling plow system 22. This releases drawbar 68 allowing the planting system to turn in a relatively short radius to begin planting another section.

The single pass planting operation of the system described and shown plows, plants, fertilizers and delivers the insecticides and herbacides needed in a single pass rather than the four passes needed with conventional tilling planting systems which greatly saves fuel, equipment operating hours and labor hours. While a planter has been disclosed for planting six parallel rows the principles of operation would apply equally to 2, 4, 6, 8, or even larger row planting systems. The system uses a fracture tilling plow mounted on a specially designed frame which simultaneously delivers anhydrous ammonia to the rear of the plow shank at approximately the depth being plowed. The frame design can be adapted for 2, 4, or 8, row planters. The specially designed hitch system allows the entire planting system to be easily turned with the drawn planter recentered and locked. The locking system can if desired be designed to automatically activate when the plow system is lowered. The hydraulic drawbar locking system assures that the drawn planter remains properly aligned behind the plow system even on contoured or sloped surfaces.

This invention is not to be limited by embodiment shown in the drawings and described in the description which is given by way of example and not of limitation but only in accordance with the scope of the dependent claims.

What is claimed:
1. A single pass planting system;
a tractor;
sub-soil plow means;
lift connecting means connecting said plow means to said tractor;
planter means having planter bins for delivering seed, insecticide and fertilizer;
hitch means connecting said planter means to said sub-soil plow means for trailing simultanaously with said sub-soil plow means;
said hitch means having drawbar means connected to said planter means, said drawbar means mounted for pivotal movement at one end, the other end being connected to said planter means;

a curved track on said hitch means beneath the end of said drawbar connected to said planter means;

roller means mounted on said drawbar means;

said roller means resting on said curved track supporting and guiding said drawbar when it is allowed to swing from side to side;

hydraulic centering means connected to said drawbar for automatically centering said drawbar after a turn is made and during a planting pass;

said hydraulic centering means comprising a pair of hydraulic cylinder means on either side of said drawbar abutting and holding said drawbar in a centered position and releasing said drawbar for swinging movement when retracted;

multi-point pivot connecting means connecting said hitch means to said sub-soil plow means whereby said hitch means remains level whenever said sub-soil plow is lifted to make turns.

2. The planting system according to claim 1 in which said lift connecting means comprises;

a yoke mounted on said tractor means attaching said yoke to said subsoil plow means at three points; the centermost point being connected to a spring loaded lift pin whereby said subsoil plow means remains level when being lifted.

3. The planting system according to claim 1 including drawbar damping means for damping the swinging movement of said drawbar to prevent shocks to said planter means.

4. The planting system according to claim 3 in which said hitch means includes 360 degree swivel mounted flotation tires.

5. A planting system according to claim 4 in which said hitch means includes a vertical stanchion, a plurality of quick disconnect means mounted on said stanchion whereby hoses between said tractor and said planter means may be easily connected and disconnected.

6. The planting system according to claim 1 including storage tanks mounting on said sub-soil plow means; a plurality of plow blades on said sub-soil plow means; a plurality of tubular conduits attached to and following the contour of a trailing edge of each of said plow blades for injecting a fluid into the ground as it is being plowed.

7. The planting system according to claim 6 in which said plow means includes adjustable depth gage wheels.

* * * * *